(12) United States Patent
Niemelä

(10) Patent No.: US 12,463,988 B2
(45) Date of Patent: Nov. 4, 2025

(54) ARRANGEMENT AND METHOD OF PRIVILEGE ESCALATION DETECTION IN A COMPUTER OR COMPUTER NETWORK

(71) Applicant: WithSecure Corporation, Helsinki (FI)

(72) Inventor: Jarno Niemelä, Helsinki (FI)

(73) Assignee: WITHSECURE CORPORATION, Helsinki (FI)

( * ) Notice: Subject to any disclaimer, the term of this patent is extended or adjusted under 35 U.S.C. 154(b) by 316 days.

(21) Appl. No.: 18/172,729

(22) Filed: Feb. 22, 2023

(65) Prior Publication Data

US 2023/0269261 A1    Aug. 24, 2023

(30) Foreign Application Priority Data

Feb. 23, 2022  (GB) .................................... 2202482

(51) Int. Cl.
*H04L 29/00* (2006.01)
*H04L 9/40* (2022.01)

(52) U.S. Cl.
CPC ........ *H04L 63/1416* (2013.01); *H04L 63/105* (2013.01)

(58) Field of Classification Search
CPC ............... H04L 63/1416; H04L 63/105; H04L 63/1433; H04L 63/1408; H04L 9/40; G06F 21/554; G06F 21/577; G06F 21/6218; G06F 21/62
See application file for complete search history.

(56) References Cited

U.S. PATENT DOCUMENTS

| | | | | |
|---|---|---|---|---|
| 7,437,766 B2 * | 10/2008 | Cohen | ..................... | G06F 21/52 |
| | | | | 726/26 |
| 8,601,531 B1 * | 12/2013 | Zolfonoon | ............ | G06F 21/604 |
| | | | | 726/4 |
| 9,106,689 B2 * | 8/2015 | Steinbrecher | ........... | H04L 63/14 |
| 9,392,007 B2 * | 7/2016 | Giokas | ............... | H04L 63/1416 |
| 9,411,955 B2 * | 8/2016 | Jakobsson | ............... | H04L 63/14 |
| 9,432,393 B2 * | 8/2016 | Bartos | ................. | H04L 63/1425 |
| 9,921,937 B2 * | 3/2018 | Seto | ........................ | G06F 11/008 |
| 10,454,934 B2 * | 10/2019 | Parimi | ..................... | H04L 63/20 |
| 10,592,678 B1 * | 3/2020 | Ismael | ..................... | G06F 21/62 |

(Continued)

*Primary Examiner* — Don G Zhao
(74) *Attorney, Agent, or Firm* — NIXON & VANDERHYE

(57) ABSTRACT

An arrangement and a method of privilege escalation detection in a computer or computer network. The method comprises examining which executables are running in a target host; searching from a behavioral data source behavioral information of the executables running in the target host; including in a first list identification information of executables running in the target host which the behavioral information indicates are known to run with a first or a higher level privilege; including in a second list identification information of sensitive resources loaded or executed by the executables included in the first list; examining the sensitive resources included in the second list to determine whether that resource is writable by an executable running at a privilege level lower than the first level; and providing an indication of every resource that is loaded by the first or higher level privilege executable but is writable by the executable running at a privilege level lower than the first level as a potential vulnerability.

13 Claims, 5 Drawing Sheets

(56) References Cited

U.S. PATENT DOCUMENTS

| | | | | |
|---|---|---|---|---|
| 10,963,583 B1* | 3/2021 | Shimony | | G06F 21/577 |
| 11,301,235 B1* | 4/2022 | Erdogan | | G06F 8/65 |
| 11,314,859 B1* | 4/2022 | Singh | | G06F 21/554 |
| 11,516,222 B1* | 11/2022 | Srinivasan | | G06F 21/577 |
| 11,822,670 B2* | 11/2023 | Hecht | | G06F 9/54 |
| 11,995,038 B2* | 5/2024 | Gopalakrishnan | | H04L 63/0263 |
| 2007/0083912 A1 | 4/2007 | Lambert et al. | | |
| 2009/0271863 A1 | 10/2009 | Govindavajhala et al. | | |
| 2014/0205099 A1* | 7/2014 | Christodorescu | | H04L 9/321 |
| | | | | 380/278 |
| 2016/0004869 A1* | 1/2016 | Ismael | | G06F 21/577 |
| | | | | 726/1 |
| 2016/0006756 A1* | 1/2016 | Ismael | | H04L 63/1441 |
| | | | | 726/22 |
| 2016/0065594 A1* | 3/2016 | Srivastava | | H04L 63/1433 |
| | | | | 726/23 |
| 2016/0085970 A1* | 3/2016 | Rebelo | | G06F 21/51 |
| | | | | 726/25 |
| 2016/0092677 A1* | 3/2016 | Patel | | G06F 21/53 |
| | | | | 726/23 |
| 2016/0142410 A1* | 5/2016 | Mazzara, Jr. | | H04W 12/08 |
| | | | | 726/4 |
| 2016/0226904 A1* | 8/2016 | Bartos | | G06F 16/285 |
| 2017/0078315 A1* | 3/2017 | Allen | | G06F 16/25 |
| 2017/0116413 A1* | 4/2017 | Takacs | | G06F 21/552 |
| 2017/0295197 A1* | 10/2017 | Parimi | | H04L 67/10 |
| 2018/0005243 A1* | 1/2018 | Zovi | | G06Q 20/405 |
| 2018/0248889 A1* | 8/2018 | Deninno | | H04L 63/105 |
| 2018/0375891 A1* | 12/2018 | Juncker | | H04L 63/104 |
| 2019/0166126 A1 | 5/2019 | Lazarovitz et al. | | |
| 2019/0207953 A1* | 7/2019 | Klawe | | G06F 21/57 |
| 2019/0273754 A1* | 9/2019 | Ting | | G06N 3/088 |
| 2020/0067971 A1* | 2/2020 | Chiu | | G06F 21/554 |
| 2020/0076819 A1* | 3/2020 | Spurlock | | G06F 21/10 |
| 2020/0137104 A1* | 4/2020 | Hassanzadeh | | H04L 63/1433 |
| 2022/0060323 A1* | 2/2022 | Payne | | H04L 9/0897 |
| 2023/0019180 A1* | 1/2023 | de Nijs | | G06F 21/577 |
| 2023/0037069 A1* | 2/2023 | Sela | | G06F 40/30 |
| 2023/0259640 A1* | 8/2023 | Metzler | | G06F 21/6218 |
| | | | | 713/191 |
| 2024/0022583 A1* | 1/2024 | Miserendino | | H04L 63/1425 |

\* cited by examiner

ARRANGEMENT AND METHOD OF PRIVILEGE ESCALATION DETECTION IN A COMPUTER OR COMPUTER NETWORK

CROSS-REFERENCE TO RELATED APPLICATION

This application claims priority to GB 2202482.2 filed Feb. 23, 2022, the entire contents of which are hereby incorporated by reference.

TECHNICAL FIELD

The present invention relates to an arrangement and a method of privilege escalation detection in a computer or computer network.

BACKGROUND

Malware detection and scanning is a vital issue for the security of any kind of endpoints and networks. Malware detection and scanning is generally directed to identify and potentially also disinfect any kind of malware on computer and/or communication systems, such as viruses, Trojans, worms, or other kinds of security threats.

Privilege escalations in computer and computer systems are a problematic category of vulnerabilities to find, as they often are caused by incorrect permissions configuration in a particular host, which means that what is a vulnerable in one host may not be the case in another. Therefore, privilege escalation may not always be found just by doing code analysis or analyzing a freshly installed version of an application or a system.

Therefore, it would be desirable to enable a reliable privilege escalation detection which is also efficient and fast for the user of the device.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

Some embodiments are applicable to types of privilege escalation where a low privilege executable writes content to a place where it is blindly loaded and executed by a high privilege executable.

In some embodiments such vulnerabilities may be found by collecting behavioral data of privileged applications from a suitable source, for example from an endpoint detection and response (EDR) backend or by running a local sensor on system for long time and calculating a behavioral digest. When the behavioral data is applicable, it will be analyzed and a list of every executable file run by a high privileged executable, every dynamic link library (DLL) loaded by a privileged executable and every registry key value read and/or executed by a privileged executable is collected. Then when doing a local analysis with a vulnerability discovery tool, this database is used to check are there any resources in the target host that is writable with low permissions but executed with high permissions.

In accordance with an embodiment, the following steps are performed:
examining which executables are running in a target host;
searching from a behavioral data source behavioral information of the executables running in the target host;
including in a first list identification information of executables running in the target host which the behavioral information indicates are known to run with a first or a higher level privilege;
including in a second list identification information of sensitive resources loaded or executed by the executables included in the first list;
examining the sensitive resources included in the second list to determine whether that resource is writable by an executable running at a privilege level lower than the first level; and
providing an indication of every resource that is loaded by the first or higher level privilege executable but is writable by the executable running at a privilege level lower than the first level as a potential vulnerability.

It should be noted that applications that protect their files with exclusive locking, such as installers may not be reported as they do not show as writable for the examination. If the examination sees a file or registry key as writable, it may be assumed that it can be tampered by an attacker.

According to a first aspect, the invention relates to a method, e.g., a computer implemented method, of privilege escalation detection in a computer or computer network. In the method a software application is started in a computer or in a server and it starts to examine which executables are running in a target host (computer). The software application also searches from a behavioral data source behavioral information of the executables running in the target host. The software application includes in a first list identification information of executables running in the target host which the behavioral information indicates are known to run with a first or a higher level privilege; and includes in a second list identification information of sensitive resources loaded or executed by the executables included in the first list. Then the software application examines the sensitive resources included in the second list to determine whether that resource is writable by an executable running at a privilege level lower than the first level. The software application provides an indication of every resource that is loaded by the first or higher level privilege executable but is writable by the executable running at a privilege level lower than the first level as a potential vulnerability. Based on the possibly detected privilege escalation risks the software application may also cause the target host disabling such executable which is running at a privilege level lower than the first level and is able to write sensitive resources included in the second list.

In accordance with an embodiment the target host, based on the notification from the software application, stops execution of such executable, if it is already running or prevents starting the execution of such executable.

In accordance with an embodiment, the target host, based on the notification from the software application, prevents such executable to write such memory area where sensitive resources are located.

In one embodiment of the invention the software application is running on the local machine and/or a server, such as a LAN-server.

According to a second aspect, the invention relates to an arrangement for privilege escalation detection in a computer or computer network, wherein the arrangement comprises at least one computer, wherein the computer is configured to examine which executables are running in a target host; search from a behavioral data source behavioral information of the executables running in the target host; include in a first list identification information of executables running in the target host which the behavioral information indicates are known to run with a first or a higher level privilege; include in a second list identification information of sensitive resources loaded or executed by the executables included in the first list; examine the sensitive resources included in the second list to determine whether that resource is writable by an executable running at a privilege level lower than the first level; and provide an indication of every resource that is loaded by the first or higher level privilege executable but is writable by the executable running at a privilege level lower than the first level as a potential vulnerability.

In one embodiment of the invention the computer is separate from the target host.

In one embodiment of the invention the computer belongs to the target host.

In one embodiment of the invention the computer is a server remote from the target host.

According to a third aspect, the invention relates to a computer program comprising instructions which, when executed by a computer, cause the computer to carry out a method according to the invention.

According to a fourth aspect, the invention relates to a computer-readable medium comprising the computer program according to the invention.

According to a fifth aspect, the invention relates to an apparatus for privilege escalation detection in a computer or computer network, wherein the apparatus comprises at least means for:
  examining which executables are running in a target host;
  searching from a behavioral data source behavioral information of the executables running in the target host;
  including in a first list identification information of executables running in the target host which the behavioral information indicates are known to run with a first or a higher level privilege;
  including in a second list identification information of sensitive resources loaded or executed by the executables included in the first list;
  examining the sensitive resources included in the second list to determine whether that resource is writable by an executable running at a privilege level lower than the first level; and
  providing an indication of every resource that is loaded by the first or higher level privilege executable but is writable by the executable running at a privilege level lower than the first level as a potential vulnerability.

With the solution of the invention, it's possible to find such vulnerabilities allowing a low privilege executable writing content to a place or otherwise modifying content in such a place where the content is loaded without any security or permission checks and which content is executable or otherwise obtainable by a high privilege executable.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF THE DRAWINGS

The embodiments of the invention are illustrated by way of example, and not by way of limitation, in the figures of the accompanying drawings.

DETAILED DESCRIPTION

Figure 1:
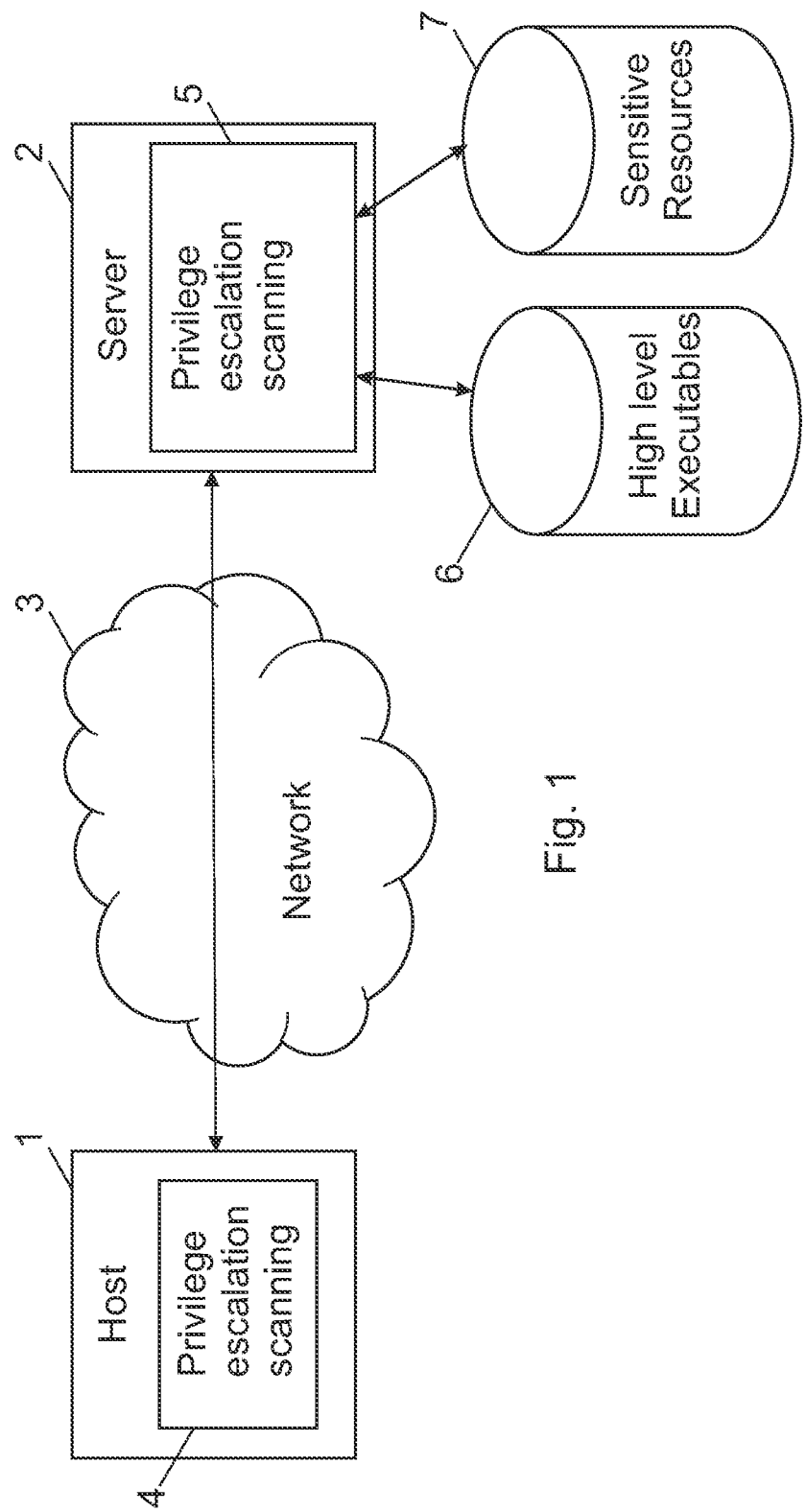
FIG. 1 presents as a schematic diagram a computer system or computer network configuration, for which exemplifying embodiments of the present invention are applicable.

FIG. 1 illustrates an example of a system where the present invention may be applied. In the solution of FIG. 1 a system configuration is presented in which a target host 1 and a remote entity or server 2 are connected via a network 3. Here, the target host 1 exemplifies any computer or communication system, including a single device, a network node or a combination of devices, on which privilege escalation threat scanning is to be performed. The scanning can be done at the target host 1 and/or at the server 2. For example, the target host 1 may include a personal computer, a personal communication device, a network-enabled device, a client, a firewall, a mail server, a proxy server, a database server, or the like. The server 2 exemplifies any computer or communication system, including a single device, a network node or a combination of devices, on which malware scanning can be performed for the target host 1, or which can provide data for the target host 1 required to carry out the privilege escalation threat scanning at the target host 1. For example, the server 2 may include a security entity or a backend entity of a security provider, or the like, and the server 2 may be realized in a cloud implementation or the like.

The network 3 exemplifies any computer or communication network, including, e.g., a (wired or wireless) local area network like LAN, WLAN, Ethernet, or the like, a (wired or wireless) wide area network like WiMAX, GSM, UMTS, LTE, or the like, and so on. Hence, the target host 1 and the server 2 can but do not need to be located at different locations. For example, the network 3 may be any kind of TCP/IP-based network. Insofar, communication between the target host 1 and the server 2 over the network 3 can be realized using for example any standard or proprietary protocol carried over TCP/IP, and in such protocol a privilege escalation threat scanning agent 4 at the target host 1 and the privilege escalation threat analysis sandbox or application 5 at the server 2 can be represented on/as the application layer.

The system comprises a high-level executable database 6 in which data of executables which have privilege above or equal to a certain level have been stores. These kinds of executables are also called as high-level executables in this disclosure. Data to the high-level executable database 6 may have been collected previously based on behavioral data of privileged applications from a suitable source, for example from an endpoint detection and response (EDR) backend or by running a local sensor on system for long time and calculating a behavioral digest.

When the behavioral data is applicable, it will be analyzed and a list of every executable file run by a high privileged executable, every dynamic link library (DLL) loaded by a privileged executable and every registry key value read and/or executed by a privileged executable is collected, for example, to a sensitive resource database 7.

It should be noted that collection of data to the high-level executable database 6 and/or the sensitive resource database 7 need not be stopped before the privilege escalation scanning is performed but may also continue during the scanning and after that to keep the data up to date.

The high-level executable database 6 and/or the sensitive resource database 7 may be located in a server and/or in a so-called "cloud" and/or in the target host 1.

Figure 3:
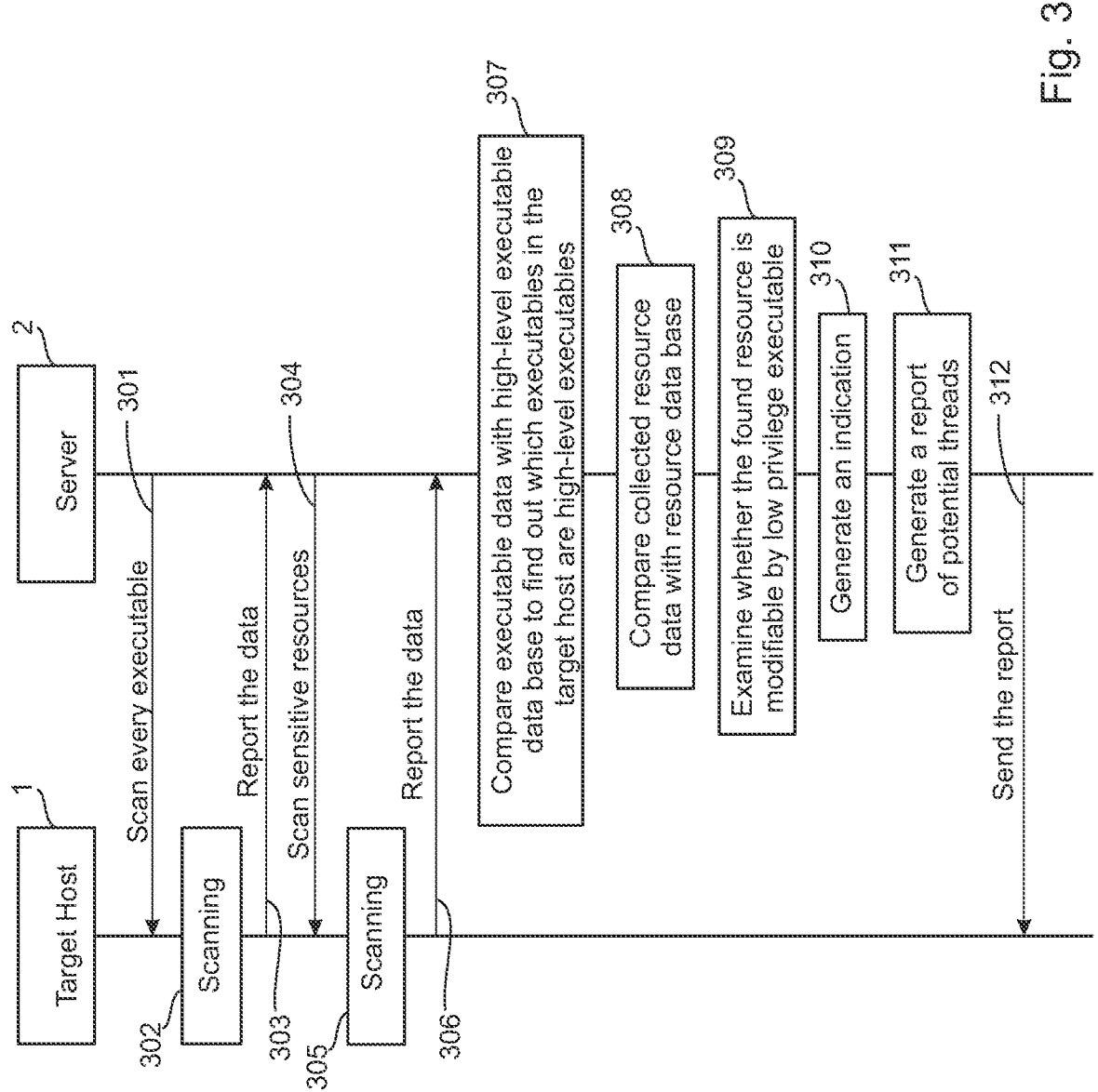
FIG. 3 presents an example embodiment of a solution of the present invention as a signalling diagram.

In the following, a method according to an embodiment will be describe with reference to the flow diagram of FIG. 3 and the system of FIG. 1. The privilege escalation threat scanning agent 4 is started at the target host 1 and the privilege escalation threat analysis application 5 is started at the server 2, if they are not already running. The privilege escalation threat analysis application 5 in the server 2 may send 301 a message to the privilege escalation threat scanning agent 4 in the target host 1 to scan 302 the target host 1 for every executable in the target host 1. When the data has been collected the data is transmitted 303 to the server 2. The server 2 may also send 304 a message to the privilege escalation threat scanning agent 4 in the target host 1 to scan 305 the target host 1 for every file path, registry key, and other such resources existing in the target host 1. When the data has been collected the data is transmitted 306 to the server 2. The privilege escalation threat scanning agent 4 examines the collected executable data and compares 307 it with the high-level executable database 6 to find out which executables are indicated to belong high-level executables. The privilege escalation threat scanning agent 4 also examines the collected resource data and compares it with the resource data in the sensitive resource database 7 to find out 308 which resources in the target host 1 are mentioned in the sensitive resource database 7, i.e., which of the resources in the target host 1 are usable by high-level executables in the target host 1. If such resource exists, the privilege escalation threat scanning agent 4 further examines 309 whether that resource is modifiable (e.g., by writing) by an executable of the target host 1 which has a low-level privilege, i.e., privilege which is not allowed to modify the sensitive resources. If the examination reveals that the resource is modifiable by low-level privilege executable in the target host 1, an indication is generated 310. The indication may be, for example, a flag (e.g., one bit) which is set to a value "true" (e.g., by setting the value of the bit to 1) indicative of a detected potential privilege escalation threat. The server 2 may generate 311 a report or other information of each detected privilege escalation threat and send 312 it to the target host 1, for example.

If the target host 1 receives indication of potential privilege escalation threat(s), the target host 1 may display that information and/or may prevent such low-level privilege executable modifying that sensitive resource or may even prevent the executable running or stop the executable if it is already running.

It should be noted that the above-mentioned preventive measures are just examples of possible actions to avoid privilege escalation happening in the target host 1.

Figure 2:
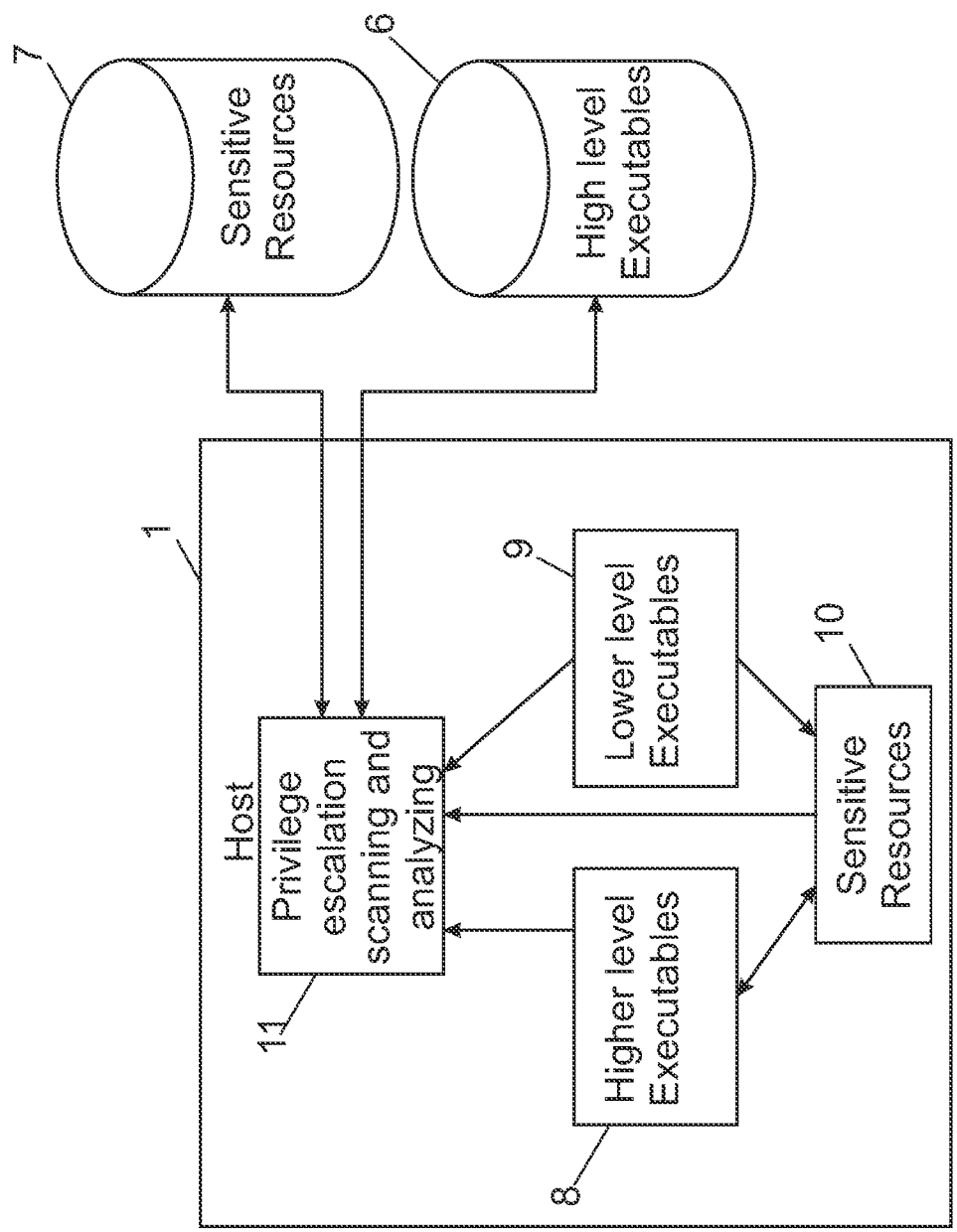
FIG. 2 presents schematically an example module composition of the solution according to one embodiment of the invention.

FIG. 2 illustrates another example of the privilege escalation threat detection. In this example the privilege escalation scanning is performed in the target host 1. The privilege escalation threat scanning and analyzing agent 11 is started at the target host 1 and the privilege escalation threat analysis application 5 is started at the server 2, if they are not already running. The privilege escalation threat scanning and analyzing agent 11 starts to scan 401 the target host 1 for every executable in the target host 1. During the scanning the privilege escalation threat scanning and analyzing agent 11 compares 402 found executables with information of the high-level executable database 6 to determine whether that executable belongs to high-level executables. If so, that executable is included 403 in a first list to examine later against the sensitive resource database 7. The privilege escalation threat scanning and analyzing agent 11 also scans the target host 1 for every file path, registry key, and other such resources existing in the target host 1 to determine if the resource is indicated in the sensitive resource database 7 loaded or executed by the high-level executables mentioned in the first list. Therefore, the privilege escalation threat scanning and analyzing agent 11 examines the collected resource data and compares the resource data to find out if that resource is indicated in the sensitive resource database 7. If such resource exists, the privilege escalation threat scanning and analyzing agent 11 includes 404 information of that resource in a second list. The privilege escalation threat scanning and analyzing agent 11 further examines 405 resources in the second list to determine whether that resource is modifiable (e.g. by writing) by an executable of the target host 1 which has a low-level privilege i.e. privilege which is not allowed to modify the sensitive resources. If the examination reveals that the resource is modifiable by low-level privilege executable in the target host 1, an indication is generated 406. The indication may be, for example, a flag (e.g. one bit) which is set to a value "true" (e.g. by setting the value of the bit to 1) indicative of a detected potential privilege escalation threat. The privilege escalation threat scanning and analyzing agent 11 may generate a report or other information of each detected privilege escalation threat and provide an indication of those potential privilege escalation threats, for example.

According to exemplifying embodiments of the invention, privilege escalation threat scanning at the target host 1 and/or by the server 2 can be realized using a malware analysis environment, such as a virtual machine or emulator environment, can be arranged at the target host 1 and/or at the server 2. For example, a privilege escalation threat scanning agent, such as an anti-virus software can be installed/arranged at the target host 1 to be used for privilege escalation threat scanning.

Based on the possibly detected privilege escalation risks malicious behavior of the software application may also cause the target host 1 disabling such executable which is running at a privilege level lower than the first level and is able to write sensitive resources included in the second list at the virtual machine or the software emulator, the local machine is notified about the malicious behavior and the virtual machine or the software emulator session is ended.

In accordance with an embodiment the target host, based on the notification from the software application, stops execution of such executable if it is already running or prevents starting the execution of such executable.

In accordance with an embodiment, the target host, based on the notification from the software application, prevents such executable to write such memory area where sensitive resources are located.

In accordance with an embodiment, based on receiving the notification about malicious behavior of the software application, the software application at the local machine is terminated and changes made by the application or to the at least one file or system configuration value are reverted based on the backed-up version of the at least one file and/or system configuration value.

In one embodiment of the invention the virtual machine or software application or an emulator is running on the local machine (the target host 1) and/or the server 2, such as a LAN-server.

In accordance with an embodiment, the examination of the sensitive resources comprises examining resources existing in the target host and comparing the resources with the sensitive resources in the second list to determine which resources existing in the target host may be vulnerable.

In accordance with an embodiment, the sensitive resources include at least file paths and/or registry keys.

In accordance with an embodiment, identification information of every executable file run by a high privileged executable, every dynamic link library loaded by a privileged executable and every registry key value read and executed by a privileged executable are included in the first list.

In accordance with an embodiment, the method is performed by the target host.

In accordance with an embodiment, the method is performed by a virtual machine or software emulator running on the target host 1.

In accordance with an embodiment, wherein the method is performed by a virtual machine or software emulator running on the server 2.

Figure 5:
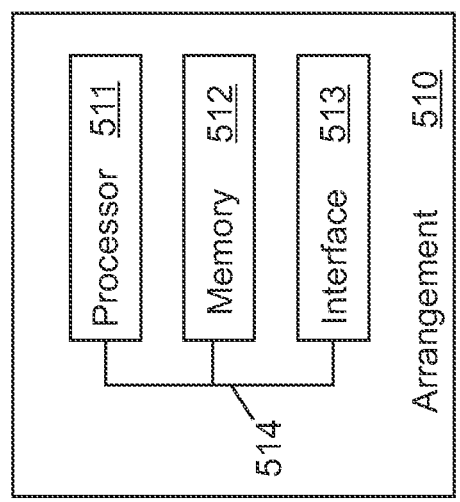
FIG. 5 presents as a schematic diagram an example of a structure of an arrangement according to exemplifying embodiments of the present invention.

In accordance with an embodiment, the behavioral data source comprises information collected by a backend from one or more target hosts on processes that are run with the first or a higher level privilege; and/or information collected by a local sensor or a computer on the target host on processes that are run in the target host with a first or a higher level privilege. As presented in FIG. 5, an arrangement 510 or at least part of the arrangement, e.g. an endpoint and/or a server, according to exemplifying embodiments of the present invention may comprise at least one processor 511 and at least one memory 512 (and possibly also at least one interface 513), which may be operationally connected or coupled, for example by a bus 514 or the like, respectively.

The processor 511 of the arrangement 510 is configured to read and execute computer program code stored in the memory 512. The processor may be represented by a CPU (Central Processing Unit), a MPU (Micro Processor Unit), etc., or a combination thereof. The memory 512 of the arrangement 510 is configured to store computer program code, such as respective programs, computer/processor-executable instructions, macros or applets, etc. or parts of them. Such computer program code, when executed by the processor 511, enables the arrangement 510 to operate in accordance with exemplifying embodiments of the present invention. The memory 512 may be represented by a RAM (Random Access Memory), a ROM (Read Only Memory), a hard disk, a secondary storage device, etc., or a combination of two or more of these. The interface 513 of the arrangement 510 is configured to interface with another arrangement and/or the user of the arrangement 510. That is, the interface 513 may represent a communication interface (including e.g. a modem, an antenna, a transmitter, a receiver, a transceiver, or the like) and/or a user interface (such as a display, touch screen, keyboard, mouse, signal light, loudspeaker, or the like).

Figure 4:
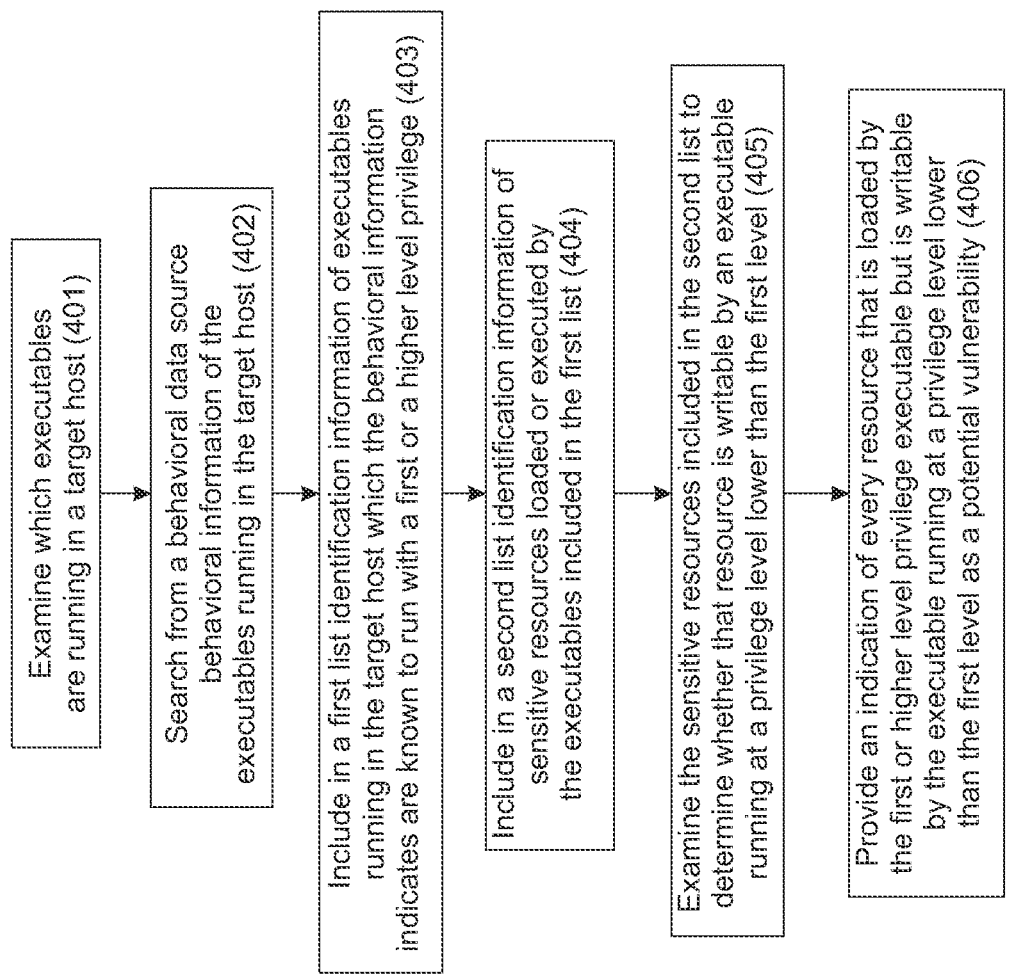
FIG. 4 presents an example method according to one embodiment of the invention.

The arrangement 510 may, for example, represent a (part of a) first node, such as local entity or host 1 in FIG. 1, or may represent a (part of a) second node, such as remote entity or server 2 in FIG. 1. The arrangement 510 may be configured to perform a procedure and/or exhibit a functionality as described in any one of FIGS. 3 to 4.

The data collected with the solution of the invention may be stored in a database or similar model for information storage for further use.

In an embodiment, further actions may be taken to secure the computer or the computer network when a malicious file, application or activity has been detected. Also, actions by changing the settings of the computers or other network nodes can be done. Changing the settings may include, for example, one or more nodes (which may be computers or other devices) being prevented from being switched off in order to preserve information in RAM, a firewall may be switched on at one or more nodes to cut off the attacker immediately, network connectivity of one or more of the network nodes may be slowed down or blocked, suspicious files may be removed or placed into quarantine, logs may be collected from network nodes, sets of command may be executed on network nodes, users of the one or more nodes may be warned that a threat or anomaly has been detected and that their workstation is under investigation, and/or a system update or software patch may be sent from the security backend to the nodes. In one embodiment of the invention one or more of these actions may be initiated automatically.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. Lists and groups of examples provided in the description given above are not exhaustive unless otherwise explicitly stated.

The invention claimed is:

1. A method of privilege escalation detection in a computer or computer network, the method comprising:
examining which executables are running in a target host;
searching from a behavioral data source behavioral information of the executables running in the target host;
including, in a first list, identification information of executables running in the target host which the behavioral information indicates are run with a first- or a higher-level privilege;
including, in a second list, identification information of sensitive resources loaded or executed by the executables included in the first list;
examining the sensitive resources included in the second list to determine whether that resource is writable by an executable running at a privilege level lower than the first level by examining resources existing in the target host, and comparing the examined resources with the sensitive resources in the second list to determine which ones of the resources existing in the target host may be vulnerable; and providing an indication of every resource that is loaded by the first- or higher-level privilege executable but is writable by the executable running at a privilege level lower than the first level as a potential vulnerability.

2. The method according to claim 1, wherein the sensitive resources include at least file paths and/or registry keys.

3. The method according to claim 1, further comprising: including, in the first list, identification information of every executable file run by a high privileged executable, every dynamic link library loaded by a privileged executable, and every registry key value read and executed by a privileged executable.

4. The method according to claim 2, further comprising: including, in the first list, identification information of every executable file run by a high privileged executable, every dynamic link library loaded by a privileged executable, and every registry key value read and executed by a privileged executable.

5. The method according to claim 1, wherein the method is performed by the target host.

6. The method according to claim 5, wherein the method is performed by a virtual machine or software emulator running on the target host.

7. The method according to claim 1, wherein the method is performed by a virtual machine or software emulator running on a server.

8. The method according to claim 1, wherein the behavioral data source comprises one or more of the following:
information collected by a backend from one or more target hosts on processes that are run with the first- or a higher-level privilege, and
information collected by a local sensor or a computer on the target host on processes that are run in the target host with the first- or higher-level privilege.

9. An arrangement for privilege escalation detection in a computer or computer network, the arrangement comprising:
at least one computer comprising circuitry configured to:
examine which executables are running in a target host,
search, from a behavioral data source, behavioral information of the executables running in the target host,
include, in a first list, identification information of executables running in the target host which the behavioral information indicates are known to run with a first- or a higher-level privilege,
include, in a second list, identification information of sensitive resources loaded or executed by the executables included in the first list,
examine the sensitive resources included in the second list to determine whether that resource is writable by an executable running at a privilege level lower than the first level by examining resources existing in the target host, and comparing the examined resources with the sensitive resources in the second list to determine which ones of the resources existing in the target host may be vulnerable, and
provide an indication of every resource that is loaded by the first- or higher-level privilege executable but is writable by the executable running at a privilege level lower than the first level as a potential vulnerability.

10. The arrangement according to claim 9, wherein the at least one computer is further configured to:
include, in the first list, identification information of every executable file run by a high privileged executable, every dynamic link library loaded by a privileged executable, and every registry key value read and executed by a privileged executable.

11. A non-transitory computer-readable medium comprising a computer program comprising instructions which, when executed by a computer, cause the computer to:
examine which executables are running in a target host;
search, from a behavioral data source, behavioral information of the executables running in the target host;
include, in a first list, identification information of executables running in the target host which the behavioral information indicates are known to run with a first- or a higher-level privilege;
include, in a second list, identification information of sensitive resources loaded or executed by the executables included in the first list;
examine the sensitive resources included in the second list to determine whether that resource is writable by an executable running at a privilege level lower than the first level by examining resources existing in the target host, and comparing the examined resources with the sensitive resources in the second list to determine which ones of the resources existing in the target host may be vulnerable; and
provide an indication of every resource that is loaded by the first- or higher-level privilege executable but is writable by the executable running at a privilege level lower than the first level as a potential vulnerability.

12. An apparatus for privilege escalation detection in a computer or computer network, the apparatus comprising:
one or more processors configured to:
examine which executables are running in a target host,
search, from a behavioral data source, behavioral information of the executables running in the target host,
include, in a first list identification, information of executables running in the target host which the behavioral information indicates are known to run with a first- or a higher-level privilege,
include, in a second list identification, information of sensitive resources loaded or executed by the executables included in the first list,
examine the sensitive resources included in the second list to determine whether that resource is writable by an executable running at a privilege level lower than the first level by examining resources existing in the target host, and comparing the examined resources with the sensitive resources in the second list to determine which ones of the resources existing in the target host may be vulnerable, and
provide an indication of every resource that is loaded by the first- or higher-level privilege executable but is writable by the executable running at a privilege level lower than the level first as a potential vulnerability.

13. The apparatus according to claim 12, wherein the one or more processors is configured to include, in the first list, identification information of every executable file run by a high privileged executable, every dynamic link library loaded by a privileged executable, and every registry key value read and executed by a privileged executable.

* * * * *